United States Patent
Danielsson et al.

(10) Patent No.: US 7,597,805 B2
(45) Date of Patent: Oct. 6, 2009

(54) ROTARY DISC FILTER AND MODULE FOR CONSTRUCTING SAME

(75) Inventors: Åke Danielsson, Skanör (SE); Åke Ralvert, Hässleholm (SE); Emil Svensson, Trelleborg (SE); Per Larsson, Trelleborg (SE)

(73) Assignee: Hydrotech Veolia Water Systems Aktiebolag, Vellinge (SE)

( * ) Notice: Subject to any disclaimer, the term of this patent is extended or adjusted under 35 U.S.C. 154(b) by 501 days.

(21) Appl. No.: 10/546,477

(22) PCT Filed: Feb. 24, 2004

(86) PCT No.: PCT/SE2004/000240

§ 371 (c)(1),
(2), (4) Date: Jul. 26, 2006

(87) PCT Pub. No.: WO2004/076026

PCT Pub. Date: Sep. 10, 2004

(65) Prior Publication Data

US 2006/0260999 A1      Nov. 23, 2006

(30) Foreign Application Priority Data

Feb. 27, 2003      (SE) ..................................... 0300532

(51) Int. Cl.
*B01D 33/23* (2006.01)
(52) U.S. Cl. ................. 210/232; 210/331; 210/486; 210/541
(58) Field of Classification Search ................. 210/232, 210/331, 486, 541
See application file for complete search history.

(56) References Cited

U.S. PATENT DOCUMENTS 3,163,601 A      12/1964      Ericsson et al.

(Continued)

FOREIGN PATENT DOCUMENTS

JP      63-219691      9/1988

(Continued)

OTHER PUBLICATIONS

International Search Report dated May 25, 2004 (3 pages).

*Primary Examiner*—Thomas M Lithgow
(74) *Attorney, Agent, or Firm*—Coats & Bennett, P.L.L.C.

(57) ABSTRACT

A rotary disk filter and a module for building a filter support for a rotary disk filter are disclosed. The rotary disk filter may comprise a drum, which is rotatable about its central longitudinal axis. The rotary disk filter may be adapted to receive a liquid which is to be filtered. In one implementation, the rotary disk filter may comprise at least one disk-shaped filter member which on the outside of the drum extends outwards in the transverse direction of the drum, and which has a filter support and at least one filter portion supported thereby. A first liquid duct may extend from the drum through the filter member and out through the filter portion. The filter portion may be made of filter segments, which are detachably secured to the filter support. At least one second liquid duct may extend between adjoining filter segments to provide liquid communication between the filter segments. The module may comprise two inner support portions and two outer support portions for at least partial enclosure of two adjoining filter segments, and an intermediate support portion adapted to be arranged between the two adjoining filter segments.

33 Claims, 4 Drawing Sheets

U.S. PATENT DOCUMENTS

| | | | |
|---|---|---|---|
| 3,331,512 A * | 7/1967 | Vore | 210/487 |
| 3,363,770 A | 1/1968 | Glos, II | |
| 3,692,181 A * | 9/1972 | Davis | 210/331 |
| 4,865,732 A | 9/1989 | Garrant et al. | |
| 4,950,403 A | 8/1990 | Hauff et al. | |
| 5,084,174 A | 1/1992 | Perälä et al. | |
| 5,635,062 A | 6/1997 | Cameron et al. | |
| 5,804,071 A | 9/1998 | Haiffner | |
| 5,893,972 A * | 4/1999 | Peterson | 210/331 |
| 6,231,761 B1 | 5/2001 | Mohlin et al. | |
| 7,255,723 B2 | 8/2007 | Choi et al. | |
| 7,293,659 B2 | 11/2007 | Grace | |

FOREIGN PATENT DOCUMENTS

| | | |
|---|---|---|
| JP | 8-508761 | 7/1996 |
| JP | 2002-508235 | 3/2002 |
| JP | 2003284906 | 10/2003 |
| JP | 2004041970 | 2/2004 |
| SE | 318859 | 4/1965 |
| SE | 224 131 | 1/1969 |
| SE | 9300541-1 | 1/1995 |
| SE | 9704632-0 | 8/1999 |
| SE | 9603333-7 | 6/2003 |
| WO | WO 91/12067 | 8/1991 |
| WO | 98/01206 | 1/1998 |
| WO | WO 99/30797 | 6/1999 |
| WO | WO 00/37159 | 6/2000 |

* cited by examiner

Fig.1

PRIOR ART

ROTARY DISC FILTER AND MODULE FOR CONSTRUCTING SAME

This application is a national stage filing under 35 U.S.C. § 371 of International Application No. PCT/SE2004/000240, filed on Feb. 24, 2004.

FIELD OF THE INVENTION

The present invention relates generally to a rotary disk filter. The rotary disk filter may comprise a drum having a central longitudinal axis and being rotatably arranged about the same and adapted to receive a liquid which is to be filtered. The rotary disk filter may also comprise at least one disk-shaped filter member which on the outside of the drum extends outwards in the transverse direction of the drum and which has a filter support and at least one filter portion supported thereby. Further, the rotary disk filter may comprise a first liquid duct extending from the drum through the filter member and out through the filter portion, the filter portion being made of filter segments, which are detachably secured to the filter support. The invention also relates to a module for building a filter support for a rotary disk filter.

BACKGROUND ART

Rotary disk filters are identified in, for example, Swedish Patent Application No. SE-C-224,131. In this filter, water is conducted through one end of a central rotatable drum and through openings in the circumference of the drum radially outwards to disk-shaped filter chambers. Each of the filter chambers are defined by a disk-shaped filter member having opposing filter portions which are supported by an annular filter support arranged between the same. The filter members are mounted in parallel along the longitudinal axis of the drum. When water flows out through the filter portions, particles are retained in the filter chambers. When cleaning the filter portions, the drum is rotated and water is flushed onto the filter portions from outside in the upper area of the rotary disk filter, particles and water flowing into the upper area of the drum and being collected in a trough extending through the drum. The filter portions comprise annular filter cloth portions arranged on the sides of the filter supports.

Swedish Patent Application No. SE-B-465,857 (WO 91/12067) discloses a rotary disk filter of a similar kind, in which the disk-shaped filter members comprise a plurality of separate, disk-shaped filter sections, which together establish annular filter members. The annular filter members are divided into a plurality of separate units, and the filter cloth is divided into smaller pieces. Therefore, in case of a local damage to the cloth, a replacement of the cloth is necessary on only one of the filter sections, and not on an entire annular disk.

In the two rotary disk filters described above, the filter cloth can be fastened in one of a plurality of ways. In a common solution, the filter cloth is glued directly to the filter support on opposing sides thereof. This is particularly common when the cloth consists of some textile or plastic material. The cloth can also be made of metal. In that case, it is often welded to the filter support, and if necessary, reinforcement ribs are welded to the outside of the filter cloth for improved securing thereof. In a further way of fixing the cloth to the support, the cloth is designed as a "bag" which is slipped around a filter support and is shrunk on the same.

Rotary disk filter constructions of this kind suffer from several problems. For example, the filter cloth has a limited life in normal use and must be replaced at regular intervals. Moreover, the filter cloth is sensitive and can easily be damaged, necessitating a premature replacement thereof. If the cloth is damaged, an entire filter cloth portion must be replaced.

Rotary disk filters with detachably secured filter segments have therefore been developed. Such a rotary disk filter is disclosed in, for example, WO 99/30797, which discloses a rotary disk filter which has a filter portion consisting of several filter segments. The filter segments are detachably secured to a filter support and comprise a frame and a filter cloth expanded by the frame. The frame and the filter support are made of metal. Using detachably secured filter segments makes it easier to replace parts of the filter. This rotary disk filter functions in a satisfactory manner, but it is desirable to improve it further by, for instance, making manufacture less expensive. It would also be desirable to make these rotary disk filters lighter and less bulky when dimensioned for large flows. Moreover, it would be desirable for the filter disks to entrain a smaller amount of water in their rotary motion than has been possible so far. A smaller amount of water would then accompany the particles through the trough of the rotary disk filter for drawing off filtered-off particles, which could thus increase the capacity of the rotary disk filter.

Rotary disk filter constructions of this kind suffer from several problems. The filter cloth has a limited life in normal use and must be replaced at regular intervals. Moreover the filter cloth is sensitive and can easily be damaged, necessitating a premature replacement thereof. If the cloth is damaged, an entire filter cloth portion must be replaced.

Rotary disk filters with detachably secured filter segments have therefore been developed. Such a rotary disk filter is disclosed in WO 99/30797, which discloses a rotary disk filter which has a filter portion consisting of several filter segments. The filter segments are detachably secured to a filter support and comprises a frame and a filter cloth expanded by the frame. The frame and the filter support are made of metal. Using detachably secured filter segments makes it easier to replace parts of the filter. This rotary disk filter functions in a satisfactory manner, but it is desirable to improve it further by, for instance, making manufacture less expensive. It would also be desirable to make these rotary disk filters lighter and less bulky when dimensioned for large flows. Moreover it would be desirable for the filter disks to entrain a smaller amount of water in their rotary motion than has been possible so far. A smaller amount of water would then accompany the particles through the trough of the rotary disk filter for drawing off filtered-off particles, which could thus increase the capacity of the rotary disk filter.

SUMMARY OF THE INVENTION

An object of the present invention is to provide a rotary disk filter which is more compact and thus has a higher filtering capacity with the same space occupied.

Another object of the present invention is to provide a rotary disk filter which is lighter than previous rotary disk filters.

A further object of the present invention is to provide a rotary disk filter can be manufactured at a lower cost.

A further object of the present invention is to provide a module that enables construction of a filter support for a more compact rotary disk filter.

Yet another object of the present invention is to provide a module that enables less expensive construction of a filter support for a rotary disk filter.

A further object of the present invention is to provide a module for building a lighter rotary disk filter.

According to one embodiment of the present invention, a disk filter may have at least one second liquid duct which extends between adjoining filter segments to provide liquid communication between the filter segments. Therefore, liquid can move between the filter segments and is not entrained in the rotary motion. As a result, the capacity of the rotary disk filter increases.

In another embodiment of the present invention, the second liquid duct may comprise hollow spaces in the filter support. Liquid communication between the filter segments can thus be provided in an extremely simple way.

The filter support between the filter segments may comprise a framework construction, whose hollow spaces constitute the second liquid ducts. In this manner, liquid communication can easily be provided, while at the same time the support can be made sufficiently strong with great economy in material.

According to another embodiment of the present invention, the filter body may be made up of modules. A rational construction can thus be ensured.

Two modules may form a filter support around a filter segment, and the two modules may then be interconnected at a distance from surrounding filter segments. This makes it possible to avoid joints between the filter segments, which makes it easier to provide a tight construction.

The filter segments can be secured to the filter support by means of grooves in the filter support which are extended in the plane of the filter segments. The filter segments can thus be safely secured to the filter support while at the same time the filter segments are easy to insert and remove. Moreover, a certain self-sealing effect can be achieved.

According to yet another embodiment of the present invention, the filter support may form at least a portion of a circumferential surface of the drum. This makes it possible to manufacture the drum with a reduced consumption of material.

The filter support may be made of plastic and can thus be manufactured at a relatively low cost. Furthermore, the filter support may be corrosion-resistant.

According to yet another embodiment of the present invention, the module for building a filter support may comprise two inner support portions and two outer support portions for at least partial enclosure of two adjoining filter segments, and an intermediate support portion adapted to be arranged between the two adjoining filter segments. Using such modules makes it possible to effectively build a filter support.

The intermediate support portion may comprise at least one liquid duct for providing liquid communication between adjoining elements. As a result, liquid can move between the filter segments and is therefore not entrained when the filter support rotates during operation of the rotary disk filter. Therefore, the capacity of the rotary disk filter can be increased.

The intermediate support portion may comprise a framework construction, the hollow spaces of which constitute liquid ducts to provide liquid communication between adjoining filter segments. The framework construction may give good strength with a minimised consumption of material and further may provide ducts for the liquid to pass between the filter segments.

One end of the outer support portions and the inner support portions may include means for interconnecting two modules. The modules can thus be interconnected to form a filter support.

The inner support portions may be arranged to form portions of a circumferential surface of the drum, which makes it possible to build the drum using a small amount of material.

The outer support portions and the inner support portions may be symmetrically arranged on the intermediate support portion. Only one type of module may thus be required for building the filter support.

According to yet a further embodiment of the present invention, the module may comprise grooves for securing of filter segments. The grooves may extend in the plane of the filter segments. This makes it possible to safely secure the filter segments in a way that makes the segment easy to attach and detach.

According to yet another embodiment of the present invention, the module is made of plastic. The module may thus be manufactured relatively inexpensively and may allow a light filter support to be built.

BRIEF DESCRIPTION OF THE DRAWINGS

The invention will now be described in more detail with reference to the accompanying schematic drawings which by way of example illustrate several embodiments of the invention.

DETAILED DESCRIPTION

Figure 1:
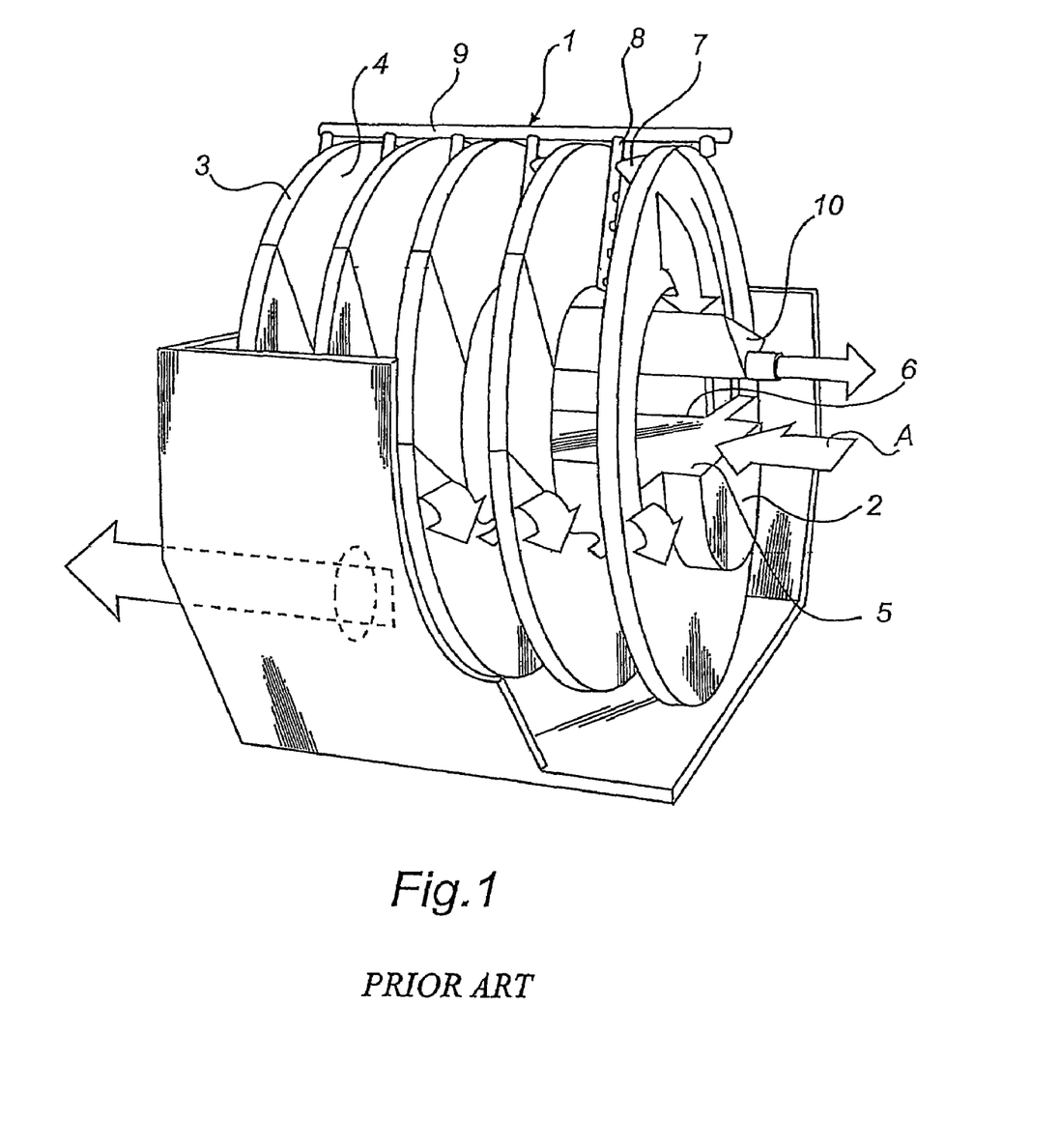
FIG. 1 is a perspective view which schematically shows the principle of a rotary disk filter according to prior-art technique.

The fundamental function of a rotary disk filter according to one embodiment of the present invention is largely the same as for prior-art rotary disk filters of the type as shown in FIG. 1. The function of the rotary disk filter of the present invention will therefore be explained with reference to FIG. 1. The rotary disk filter 1 may have a slowly rotating drum 2 which supports a plurality of disk-shaped filter members 3, whose normal direction is parallel to and concentric with the longitudinal axis or rotary axis C of the drum 2 and whose lateral faces, which are axially directed and radially extended, support a filter cloth 4. The liquid A, which is to be filtered, is conducted through an inlet 5 to the interior of the drum 2. From the interior of the drum 2, the filtering liquid A is conducted out through openings in the circumferential surface 6 of the drum 2 to the interior of the disk-shaped filter members 3. From there, the filtering liquid A is finally conducted in a filtering direction out through the filter cloth 4. Any particles in the filtering liquid A may adhere to the inside of the filter cloth 4. The rotary disk filter 1 may include flushing nozzles 7 for cleaning of the filter cloth 4, which are mounted on a number of flush tubes 8 and which extend between the disk-shaped filter members. The flush tubes 8 may be adapted to conduct flush liquid to the flushing nozzles 7 and may be connected to an elongate liquid-conducting tube 9, which extends parallel to the centre axis C of the drum. The flushing nozzles may flush the filter cloth axially from outside, in a direction opposite to the filtering direction, and the flushed-out particles may be collected in a discharge trough 10, which is placed in the drum 2 in the upper portion thereof.

Figure 2:
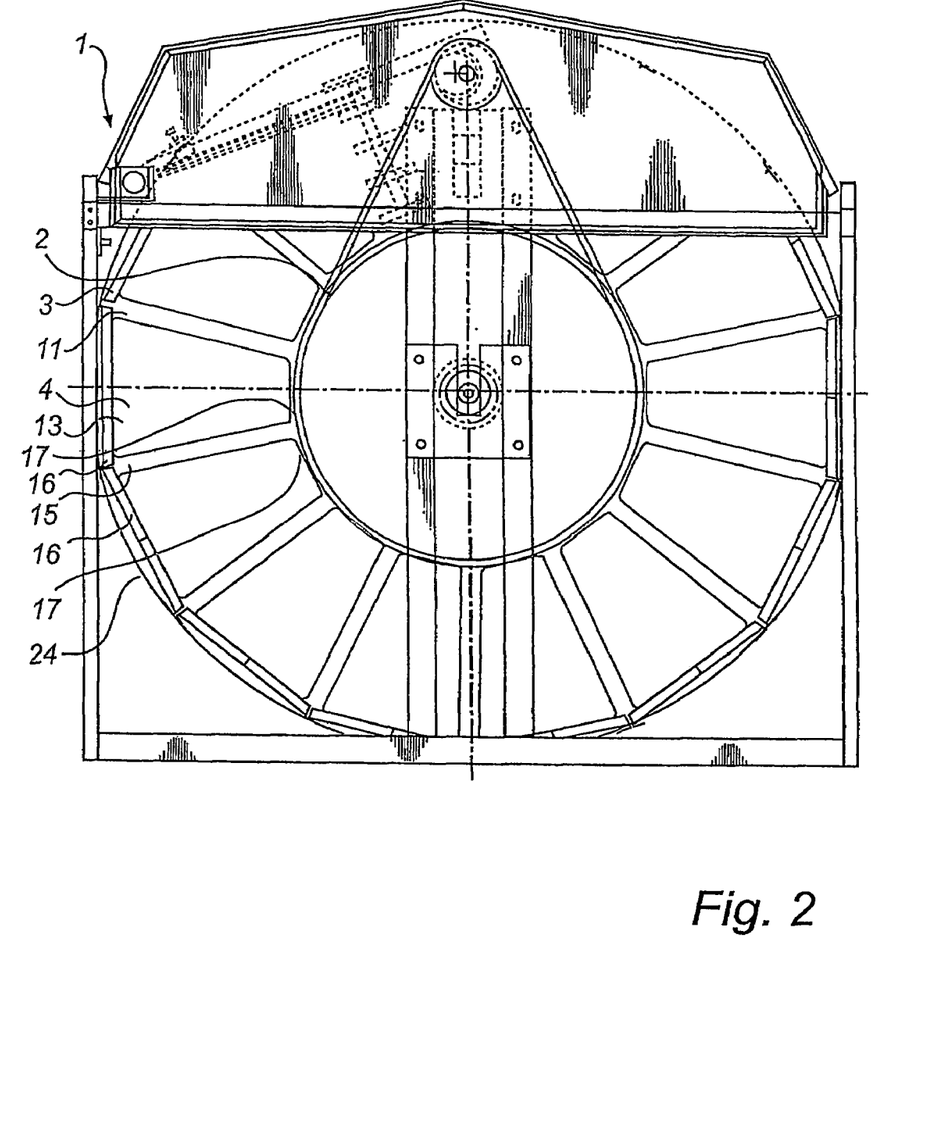
FIG. 2 is an end view of an exemplary rotary disk filter, consistent with an embodiment of the present invention.
Figure 3:
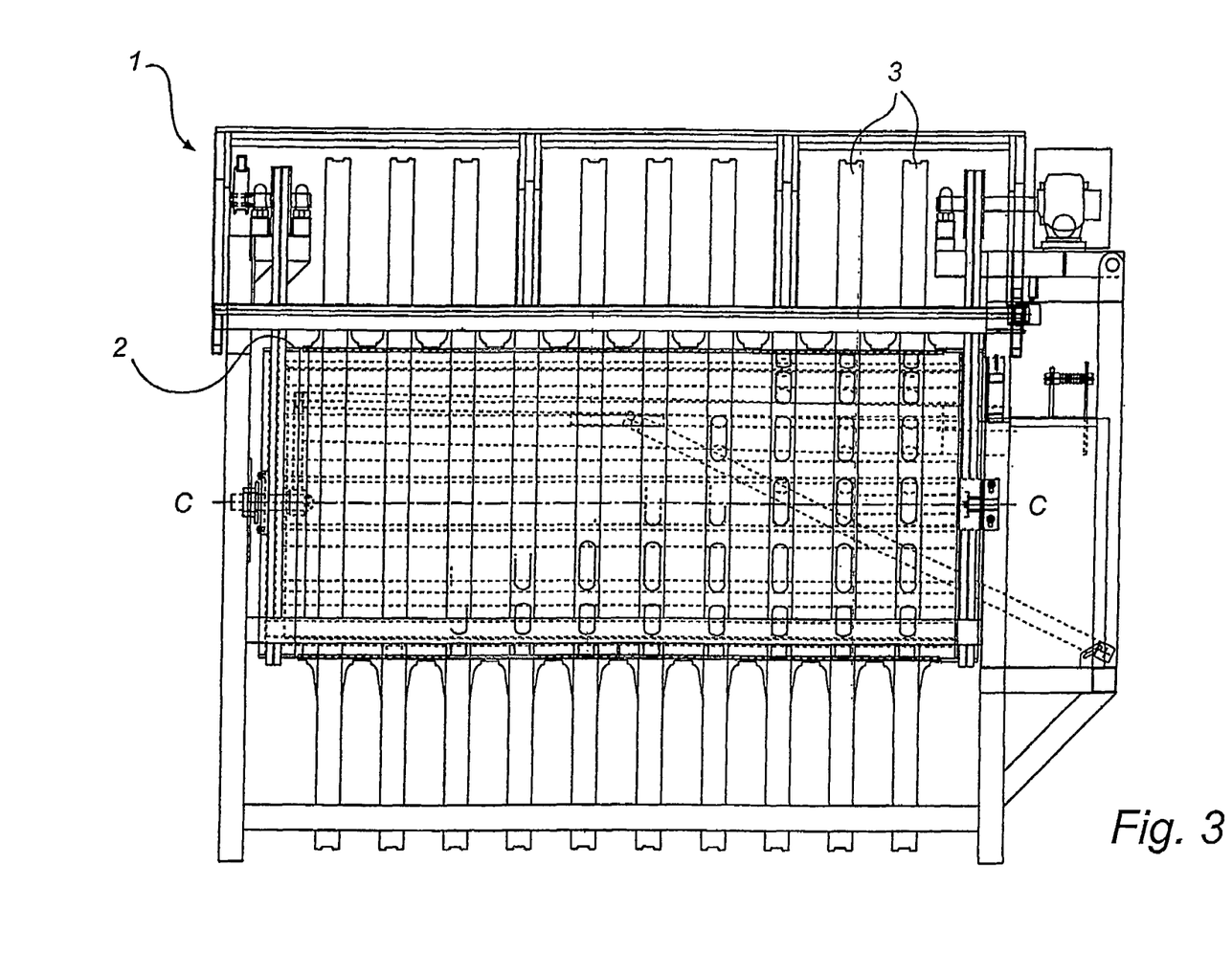
FIG. 3 is a side view of the exemplary rotary disk filter in FIG. 2, consistent with an embodiment of the present invention.
Figures 4, 5, 6:
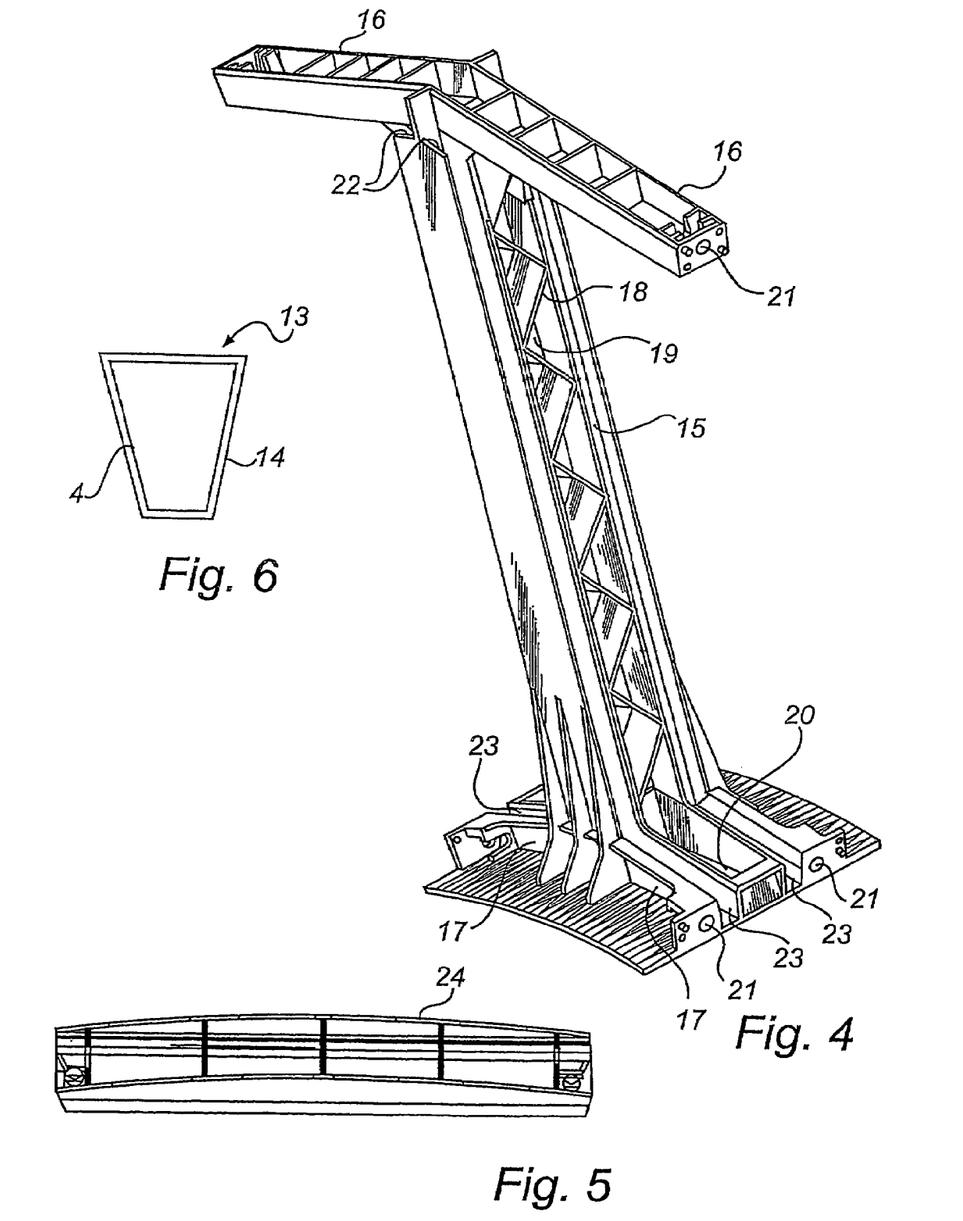
FIG. 4 is a perspective view of an exemplary module for building a filter support, consistent with an embodiment of the present invention.
FIG. 5 is a perspective view of an exemplary closing means for securing filter segments in a rotary disk filter, consistent with an embodiment of the present invention.
FIG. 6 is a top plan view of an exemplary filter segment consistent with an embodiment of the present invention.

As is evident from FIG. 2, the filter members 3 may have, according to one embodiment of the present invention, a filter support 11, which extends radially outwards in the transverse direction of the drum 2 and may be made up of a plurality of modules 12. The filter support 12 forms compartments in which filter segments 13 are arranged. As shown in FIG. 6, the filter segments 13 may consist of a frame 14 which expands the filter cloth 4.

As shown in FIG. 4, the modules 12 may have an intermediate support portion 15, from one end of which extends two outer support portions 16 outwards. From the other end of the intermediate support portion 15 extends two inner support portions 17 outwards. The intermediate support portion 15 may consist of a framework construction 18 with hollow spaces 19. The inner support portions 17 have openings 20, which allow the liquid which is to be filtered to pass from the interior of the drum 2. The inner and outer support portions 17 and 16 may have, at their ends, holes 21 for insertion of screws for interconnecting two modules 12. On both sides of the intermediate support portion 15 there may be two grooves 22, which extend parallel to the intermediate support portion 15 in the plane of the filter support 11. In each of the inner support portions 17 there may be two parallel grooves 23, which may be parallel to the inner support portion 17 and extend in the plane of the filter support 11.

FIG. 6 shows an exemplary closing means in the form of a cover 24 for securing the filter segments 13 in the filter support 11, consistent with an embodiment of the present invention.

In construction of the rotary disk filter 1, seven modules 12 may be attached to each other by means of screws in the holes 21 in such a manner that the modules form a semicircle. Two such semicircles may then be mounted on the drum 2 and bolted together to form a filter support 11. By joining the modules 12 in the center of the filter segments 13, tightness may be improved compared with the case where the joining would occur between two filter segments 13.

In each of the compartments formed by the filter support 11 between two adjoining modules 12, a filter segment 13 may be inserted into the grooves 22 and 23 on both sides of the modules 12. The cover 24 may be slipped on to the outer support portions 16 of two adjoining modules 12 and the two parallel filter segments 13 which these modules 12 enclose together. The cover 24 may be screwed to the outer support portions 16 of the modules 12. A number of thus constructed disk-shaped filter members 3 may be mounted on the drum 2 to provide the rotary disk filter 1. In one embodiment, ten filter members 3 are mounted on the drum 2. However, as many as twenty-two filter members can be arranged on a drum 2 to provide a rotary disk filter 1 with greater capacity.

In operation of the rotary disk filter 1, the liquid A, preferably polluted water, which is to be filtered, may be supplied through the inlet 5 at one end of the drum 2 and is passed through a first liquid duct which extends from the interior of the drum 2 through the openings 20 in the inner support portions 17 of the modules 12 and out through the filter cloth 4 of the filter members 3. The drum 2 rotates slowly and the filter segments 13, which are positioned in the lower part of their course, are passed by the liquid A. Pollutants may then adhere to the inside of the filter cloth 4. When the filter segments 13 are positioned in the upper part of their course, they may be cleaned by means of the above-described flushing equipment 7, 8, and 9. The flushed-out pollutants may then be removed by means of the discharge trough 10.

The hollow spaces 19 in the framework construction 18 of the intermediate support portions 15 form a second liquid duct through which the liquid A can move between the filter segments 13. In contrast to previous rotary disk filters, the liquid A may therefore not be entrained in the rotary motion of the filter members 3. The amount of liquid accompanying the pollutants out through the discharge trough 10 may thus be reduced. The speed of rotation of the drum 2 can thus be increased, which means that the capacity of the rotary disk filter 1 may be increased. Therefore, the rotary disk filter 1 can be made more compact than previous rotary disk filters. Also, the load exerted on the suspension and driving device of the drum is reduced.

The rotary disk filter 1 can be mounted at the factory and be delivered ready for use. The module construction also makes it possible to deliver modules 12 for mounting the rotary disk 1 at the site where it is to be used. The module construction also makes it easy to enlarge an existing rotary disk filter 1 in order to increase its capacity. Modules 12, filter segments 13 and covers 24 for one or more new filter members 3 can then be delivered and mounted in the existing rotary disk filter 1.

According to one embodiment, the modules 12 may be made by injection moulding of ABS plastic. Other plastic materials can be used, and a suitable manufacturing process is then selected with regard to the type of plastic. Plastic is advantageous since it is a relatively inexpensive material that is easy to work, and is also corrosion resistant. Other materials may also be selected, but it should be taken into consideration that it is convenient to use a material which has a low weight in relation to its strength, thus minimising the weight of the completed rotary disk filter.

The frame 14 of the filter segments 13 may be made of pretensioned glass fiber, which makes the frame 14 strong, light and corrosion resistant. Alternatively, the frame 14 can be made of metal, preferably stainless steel. For sealing of the filter segment 13 against the filter support 4, the frame 14 may be enclosed by a rubber strip, for example, EPDM rubber. In order to facilitate insertion and removal of the filter segments 13 in the grooves 22, the outside of the rubber strip may be flocked, which reduces friction against the filter support 11. The seal may also be promoted by the filter segments 13, as the liquid A passes out through the filter cloth 4, being pressed outwards by the liquid pressure, so that the frame 14 is pressed against the outer boundary walls of the grooves 22 and 23.

In one embodiment, the filter cloth 4, which is expanded by the frame 14, may be a microfilter cloth with filter holes in the range 10-100 µm. The filter cloth 4 may be selected according to the filtering capacity that is required.

The inventive rotary disk filter can suitably be cleaned by means of a cleaning device, for example, the cleaning device described in SE-C-515,001 (WO 00/37159).

It will be appreciated that many modifications of the embodiments of the invention described above are feasible within the scope of the invention, which is defined in the appended claims.

In the example shown, the modules 12 may be mounted on a drum 2, the circumferential surface 6 of which has openings for the liquid to pass from the interior of the drum 2 to the filter segments 11. The light-weight modules 12 make it possible to select instead to make a skeleton for a drum and let the inner support portions 17 form the circumferential surface of the drum on the outside of the skeleton.

Instead of making the intermediate support portions 12 with a framework construction 18, the intermediate support portions can be given a flat web in which holes are bored to provide liquid communication between the filter segments.

The invention claimed is:

1. A rotary disc filter device comprising:
   a. a rotary drum having an inlet for receiving liquid to be filtered;
   b. a drive for rotatively driving the rotary drum;
   c. one or more disc-shaped filter members secured about the drum and extending outwardly therefrom, each disc-shaped filter member being rotatable with the drum;
   d. each disc-shaped filter member including a filter disposed on each side thereof;
   e. each disc-shaped filter member including a filter frame having a plurality of circumferential spaced radial supports that project outwardly from the drum and divide the disc-shaped filter member into a plurality of compartments for holding liquid to be filtered where each compartment is generally defined, in part at least, by two consecutive radial supports and the filters;
   f. an array of openings formed in the drum with each opening being aligned with a respective compartment for permitting liquid to pass from the drum into the respective compartments of the one or more disc-shaped filter members; and
   g. each radial support having a length and a substantial open area formed to substantially along the entire length of the radial support for permitting liquid to flow from a leading compartment into a trailing compartment through the substantial open area along the length of an intervening radial support as the drum and the one or more of the disc-shaped filter members are rotated.

2. The rotary disc filter device of claim 1 wherein the filter frame is modular and wherein each radial support forms a part of a module and wherein a series of the modules are connected together to form at least a part of the filter frame.

3. The rotary disc filter device of claim 2 wherein each module includes a base disposed at an inner end of the radial support and wherein the base is disposed adjacent the rotary drum; the base including an opening aligned with an opening in the rotary drum such that liquid can flow from the drum, through the opening in the drum and through the opening in the base; and wherein the radial support of each module includes a series of openings formed between the inner end of the radial support and an outer end of the radial support.

4. The rotary disc filter device of claim 3 wherein each filter disposed on one side of the disc-shaped filter member includes a series of filter segments; and wherein the radial support of each module includes at least one slot disposed on each side of the radial support for receiving and generally retaining a portion of one of the filter segments.

5. The rotary disc filter device of claim 4 wherein the radial support of each module includes a pair of slots on each side of the radial support for receiving and retaining portions of two filter segments.

6. The rotary disc filter device of claim 2 wherein each module is formed of plastic.

7. The rotary disc filter of claim 3, wherein the filter frame includes a rim structure; wherein each modules includes at least one rim section that is integral with the radial support of the module; and wherein the integral rim section projects from an upper end portion of the radial support of the module and forms a part of the rim structure of the filter frame.

8. The rotary disc filter device of claim 7 wherein the rim section integral with the radial support of the module projects generally circumferentially from the upper end portion of the radial support such that the radial support and rim section assume a generally T-shape.

9. The rotary disc filter of claim 3, wherein the filter frame includes a rim structure; and wherein there is at least one rim section associated with each radial support of each module and wherein the rim section projects from an upper portion of at least one radial support and forms a part of the rim structure of the filter frame.

10. The rotary disc filter device of claim 3 where the base of each module includes opposed ends and wherein the opposed ends of respective bases are configured to be secured together in end-to-end relationship around the rotary drum.

11. The rotary disc filter device of claim 4:
   wherein each module is formed of plastic;
   wherein the filter frame includes a rim structure and wherein each module includes at least one rim section that is integral with the radial support of the module, and wherein the integral rim section projects from an upper end portion of the radial support of the module and forms a part of the rim structure of the filter frame; and
   wherein the base of each module includes opposed ends and wherein the opposed ends of respective bases are configured to be secured together in end-to-end relationship around the rotary drum.

12. The rotary disc filter device of claim 10, wherein each module includes the base disposed at an inner end of the radial support and wherein the base is disposed adjacent the rotary drum; the base including an opening aligned with an opening in the rotary drum such that liquid can flow from the drum, through the opening in the drum and through the opening in the base; wherein the radial support of each module includes a series of openings formed between the inner end of the radial support and the outer end of the radial support; and wherein the radial support of each module includes a pair of slots on each side of the radial support for receiving and retaining portions of at least two filter segments.

13. The rotary disc filter device of claim 3, wherein the base of each module includes a plate and a raised structure disposed on the plate and having portions elevated with respect to the plate; the plate being secured adjacent an opening in the rotary drum; wherein the raised structure disposed on the plate forms, in part at least, the opening provided in the base; and wherein the radial support is integral with the raised structure of the base and extends outwardly therefrom.

14. The rotary disc filter device of claim 1, wherein each filter disposed on one side of the disc-shaped filter member includes a series of generally trapezoidal-shaped filter segments supported on the filter frame.

15. The rotary disc filter device of claim 1, wherein the filter frame is modular and wherein each radial support forms a part of a module and wherein a series of modules are connected together to form at least a part of the filter frame; wherein each filter disposed on one side of the disc-shaped filter member includes a series of filter segments; wherein each module includes a base disposed at an inner end of the radial support and wherein both the base and radial support includes a slot for receiving and holding at least one filter segment.

16. A rotary disc filter device comprising:
   a. a rotary drum having an inlet for receiving liquid to be filtered;
   b. a drive for rotatively driving the rotary drum;
   c. one or more disc-shaped filter members secured about the drum and extending outwardly therefrom, each disc-shaped filter member being rotatable with the drum;
   d. each disc-shaped filter member including a filter disposed on each side thereof;
   e. each disc-shaped filter member including a modular filter frame made up, in part at least, by a series of interconnected modules, each module comprising:

i. a base secured adjacent the rotary drum and including an opening aligned with an opening in the rotary drum such that liquid can flow from the drum, through the opening in the drum, and through the opening in the base;

ii. a radial support projecting outwardly from the base and including an inner end disposed adjacent the base and an outer end disposed away from the base;

iii. each radial support having a length and a substantial open area formed substantially along the entire length of the radial support for permitting liquid to flow through the radial support as the one or more filter members rotate;

f. wherein the modular filter frame includes a series of interconnected modules that include a plurality of circumferentially spaced radial supports that project outwardly from the drum and divide the disc-shaped filter member into a plurality of compartments for holding liquid to be filtered where each compartment is generally defined, in part at least, by two consecutive radial supports and the filters;

g. an array of openings formed in the drum with each opening being aligned with a respective compartment for permitting liquid to pass from the drum into the respective compartments of the one or more disc-shaped filter members;

h. wherein when the modules are connected together around the drum, the bases engage and rest on the drum and the openings in the bases align with the openings in the drum; and i. wherein there is provided a series of rim sections that project from the outer end portion of the respective radial supports and form a rim structure around the disc-shaped filter member.

17. The rotary disc filter device of claim 16, wherein the rim sections form a part of the modules such that each module includes a rim section.

18. The rotary disc filter device of claim 16 wherein each module is constructed of plastic, and wherein the base of each module includes opposed ends and wherein the opposed ends of respective bases are configured such that one base of one module is connected to another base of another module in end-to-end relationship.

19. The rotary disc filter device of claim 16 wherein the base of each module includes a plate and a raised structure disposed on the plate and having portions elevated with respect to the plate; the plate being secured adjacent an opening in the rotary drum; wherein the raised structure disposed on the plate forms, in part at least, the opening provided in the base; and wherein the radial support is integral with the raised structure of the base and extends outwardly therefrom.

20. The rotary disc filter device of claim 19 wherein each radial support includes a substantial open area disposed between an inner end and an outer end of the radial support for permitting liquid to flow from one compartment to an adjacent compartment as the drum and one or more disc-shaped filter members are rotated.

21. The rotary disc filter of claim 16 wherein the radial support of each module includes a pair of opposed sides interconnected by a series of crossing webs that define a series of openings in the radial support.

22. The rotary disc filter device of claim 16 wherein the base includes a plate that is secured adjacent an opening in the rotary disc; and wherein each module is constructed of plastic, and wherein there is provided a plurality of reinforcing ribs extending between the plate of the base and opposite sides of the radial support of each module.

23. The rotary disc filter device of claim 16, wherein each module comprises only one base and only one radial support, and wherein each base of each module includes opposed ends; and wherein the base of the modules are connected together by securing the ends of the respective bases together.

24. The rotary disc filter device of claim 23, including fasteners for connecting together the opposed ends of respective bases.

25. The rotary disc filter device of claim 16, wherein each filter disposed on one side of the disc-shaped filter member includes a series of filter segments; and wherein the radial support of each module includes at least one slot disposed on each side of the radial support for receiving and generally retaining a portion of one of the filter segments.

26. The rotary disc filter device of claim 25, wherein the radial support of each module includes a pair of slots each side of the radial support for receiving and retaining portions of two filter segments.

27. The rotary disc filter device of claim 16, wherein each base of each module includes a curved plate engaged with the rotary drum, a raised structure indented from outer edges of the base, and a series of ribs extending between the curved plate and the raised structure.

28. The rotary disc filter device of claim 27, wherein the raised structure of the base at least partially forms an opening in the base that permits liquid to flow from the drum into the disc-shaped filter member.

29. The rotary disc filter device of claim 28, wherein the raised structure extending upwardly from the curved plate of each module includes openings that permit the base of one module to be secured to the base of another module with fasteners.

30. The rotary disc filter device of claim 16 wherein the modular filter frame comprises first and second sets of modules where each module of the first set includes the base and the radial support, and wherein each module in the second set forms at least a part of a rim structure of the modular filter frame.

31. The rotary disc filter device of claim 30, wherein the second set of modules includes a series of members that are attached to the first set of modules.

32. The rotary disc filter device of claim 31, wherein each of the modules of the first set includes an upper portion extended away from the radial support and the series of members of the second set of modules includes a plurality of rim sections with one of the rim sections extending between the upper portion of each of the modules of the first set to the upper portion of an adjacent module of the first set such that the rim sections and the upper portions form the rim structure of the modular filter frame.

33. The rotary disc filter device of claim 31, wherein each filter disposed on one side of the disc-shaped filter member includes a series of filter segments and wherein the radial support of each module includes at least one slot disposed on each side of the radial support for receiving and generally retaining a portion of one of the filter segments; and wherein the members of the second set of modules function to at least partially secure the filter segments to the modular filter frame.

* * * * *

UNITED STATES PATENT AND TRADEMARK OFFICE
CERTIFICATE OF CORRECTION

PATENT NO. : 7,597,805 B2 Page 1 of 1
APPLICATION NO. : 10/546477
DATED : October 6, 2009
INVENTOR(S) : Danielsson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 719 days.

Signed and Sealed this

Twenty-eighth Day of September, 2010

David J. Kappos
*Director of the United States Patent and Trademark Office*